US012136732B2

(12) United States Patent
Nam et al.

(10) Patent No.: US 12,136,732 B2
(45) Date of Patent: Nov. 5, 2024

(54) CATHODE ACTIVE MATERIAL FOR LITHIUM SECONDARY BATTERY, AND LITHIUM SECONDARY BATTERY COMPRISING SAME

(71) Applicants: POSCO, Pohang-si (KR); RESEARCH INSTITUTE OF INDUSTRIAL SCIENCE & TECHNOLOGY, Pohang-si (KR); POSCO CHEMICAL CO., LTD., Pohang-si (KR)

(72) Inventors: Sang Cheol Nam, Seoul (KR); Jung Hoon Song, Seoul (KR); Kwon Young Choi, Seoul (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO CHEMICAL CO., LTD., Pohang-si (KR)

( * ) Notice: Subject to any disclaimer, the term of this patent is extended or adjusted under 35 U.S.C. 154(b) by 711 days.

(21) Appl. No.: 17/298,298

(22) PCT Filed: Nov. 29, 2019

(86) PCT No.: PCT/KR2019/016790
§ 371 (c)(1),
(2) Date: May 28, 2021

(87) PCT Pub. No.: WO2020/111893
PCT Pub. Date: Jun. 4, 2020

(65) Prior Publication Data
US 2022/0093920 A1    Mar. 24, 2022

(30) Foreign Application Priority Data

Nov. 30, 2018 (KR) .................. 10-2018-0152147
Nov. 29, 2019 (KR) .................. 10-2019-0157312

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01); *H01M 10/0525* (2013.01); *C01P 2002/74* (2013.01)

(58) Field of Classification Search
CPC ........ H01M 4/505; H01M 4/525; C01G 53/50
See application file for complete search history.

(56) References Cited

U.S. PATENT DOCUMENTS 9,093,712 B2 * 7/2015 Kato ................. H01M 10/0568
10,355,276 B2 * 7/2019 Eguchi ................. H01M 4/525
(Continued)

FOREIGN PATENT DOCUMENTS

| CN | 103531779 A | 1/2014 |
|----|-------------|--------|
| CN | 103715426 A | 4/2014 |

(Continued)

OTHER PUBLICATIONS

Machine translation of the PCT-237 (ETWOS) (Year: 0000).*
(Continued)

*Primary Examiner* — Amanda C. Walke
(74) *Attorney, Agent, or Firm* — Morgan, Lewis & Bockius LLP

(57) ABSTRACT

A positive active material for a lithium secondary battery and a lithium secondary battery including the same are provided, wherein the positive active material includes lithium, nickel, cobalt, manganese, and a doping element, and the doping element may include Zr, Al, and Ti.

8 Claims, 2 Drawing Sheets

(51) Int. Cl.
*H01M 4/505* (2010.01)
*H01M 10/0525* (2010.01)

(56) References Cited

U.S. PATENT DOCUMENTS

| | | | | |
|---|---|---|---|---|
| 10,763,507 | B2* | 9/2020 | You | H01M 4/36 |
| 10,964,944 | B2* | 3/2021 | Eguchi | C01G 45/1228 |
| 2002/0192556 | A1* | 12/2002 | Lampe-Onnerud | H01M 4/525 |
| | | | | 429/231.95 |
| 2005/0058588 | A1* | 3/2005 | Kang | H01M 4/505 |
| | | | | 429/231.1 |
| 2016/0141607 | A1* | 5/2016 | Park | H01M 4/505 |
| | | | | 252/182.1 |
| 2016/0336594 | A1* | 11/2016 | Ahn | H01M 4/505 |
| 2018/0233739 | A1 | 8/2018 | Park et al. | |
| 2019/0296350 | A1* | 9/2019 | Eguchi | H01M 4/525 |

FOREIGN PATENT DOCUMENTS

| | | | | |
|---|---|---|---|---|
| CN | 107925063 | A | 4/2018 | |
| CN | 108336326 | A | 7/2018 | |
| EP | 2654109 | A1 | 10/2013 | |
| EP | 3312913 | A1 | 4/2018 | |
| EP | 3388394 | B1 | 4/2020 | |
| EP | 3809507 | A1 | 4/2021 | |
| JP | 2012-033397 | A | 2/2012 | |
| JP | 2012-252844 | A | 12/2012 | |
| JP | 2015-008582 | A | 1/2015 | |
| JP | 2018-525314 | A | 9/2018 | |
| KR | 10-2014-0089851 | A | 7/2014 | |
| KR | 10-2017-0046921 | A | 5/2017 | |
| KR | 10-2017-0063407 | A | 6/2017 | |
| KR | 10-2017-010681 | A | 9/2017 | |
| KR | 10-2017-0116569 | A | 10/2017 | |
| KR | 10-2018-0070435 | A | 6/2018 | |
| KR | 10-2018-0077018 | A | 7/2018 | |
| KR | 10-2018-0077081 | A | 7/2018 | |
| KR | 10-2018-0099542 | A | 9/2018 | |
| WO | WO-2016006557 | A1 * | 1/2016 | C01G 51/50 |
| WO | 2017/150506 | A1 | 9/2017 | |

OTHER PUBLICATIONS

Chinese Office Action dated Oct. 26, 2023 issued in Chinese Patent Application No. 201980079229.X.
European Observation by a Third Party dated Sep. 21, 2023 issued in European Patent Application No. 19889609.4.
Extended European Search Report dated Jan. 28, 2022 issued in European Patent Application No. 19889609.4.
Written Opinion and International Search Report dated Mar. 25, 2020 issued in International Patent Application No. PCT/KR2019/0163790 (with English translation).
S. Sivaprakash et al., "Understanding the role of Zr4+ cation in improving the cycleability of LiNi0.8Co0.15Zr0.05O2 cathodes for Li ion rechargeable batteries," J. Alloys Compd., 2009, vol. 479, pp. 561-568.
M. Raja et al. "Investigation of microstructural, optical and dc electrical properties of spin coated Al:WO3 thin films for n-Al: WO3/p-Si heterojunction diodes," Optik, vol. 145 (2017) pp. 169-180.
M. Guilmard et al., "Thermal Stability of Lithium Nickel Oxide Derivatives. Part II: LixNi0.70Co0.15Al0.15O2 and LixNi0.90Mn0.10O2 (x=0.50 and 0.30). Comparison with NixNi1.02O2 and LixNi0.89l10.16O2," Chem. Mater., 2003, vol. 15, pp. 4476-4483.
M. Guilmard, et al., "Thermal Stability of Lithium Nickel Oxide Derivatives. Part I: LixNi1.02O2 and LixNi0.89Al0.16O2 (x=0.50 and 0.30)," Chem. Mater., 2003, vol. 15, pp. 4484-4493.
C. Liang, et al., "Site-dependent multicomponent doping strategy for Ni-rich LiNi1—2yCoyMnyO2(y=1/12) cathode materials for Li-ion batteries," Journal of Materials Chemistry A, the Royal Society of Chemistry, Nov. 10, 2017, vol. 5, pp. 25303-25313.
J. Kim et al., A comparative study on the substitution of divalent, trivalent and tetravalent metal ions in LiNi1—xMxO2 (M=Cu2+, Al3+ and Ti4+), J. Power Sources, 2002, vol. 104, pp. 33-39.
J. Kim et al., The effect of tetravalent titanium substitution in LiNi1—xTixO2 (0.025<x<0.2) system, Electrochem. Commun., 2001, vol. 3, pp. 52-55.
H. J. Bang et al., "Synthesis and electrochemical properties of Li[Ni0.45Co0.1Mn0.45-xZrx]O2(x=0, 0.02) via co-precipitation method," J. Power Sources, 2007, vol. 174, pp. 565-568.
C. X. Ding, et al., "Improvement of electrochemical properties of layered LiNi1/3Co1/3Mn 1/3O2 positive electrode material by zirconium doping," Solid State Ionics, 2011, vol. 189, pp. 69-73.

\* cited by examiner

CATHODE ACTIVE MATERIAL FOR LITHIUM SECONDARY BATTERY, AND LITHIUM SECONDARY BATTERY COMPRISING SAME

CROSS-REFERENCE OF RELATED APPLICATIONS

This application is the U.S. National Phase under 35 U.S.C. § 371 of International Patent Application No. PCT/KR2019/016790, filed on Nov. 29, 2019, which in turn claims the benefit of Korean Application Nos. 10-2018-0152147, filed on Nov. 30, 2018 and 10-2019-0157312, filed on Nov. 29, 2019, the entire disclosures of which applications are incorporated by reference herein.

TECHNICAL FIELD

The present disclosure relates to a positive active material for a lithium secondary battery and a lithium secondary battery including the same.

BACKGROUND ART

In recent years, due to an explosive demand of electric vehicles and a demand for increasing mileage, secondary batteries with high capacity and a high energy density to meet the demands are being actively developed worldwide.

Particularly, in order to satisfy this requirement, a nickel cobalt manganese (NCM)-based positive active material including Li, Ni, Co, and Mn with a high Ni content should be used. However, as a Ni content increases in these NCM positive active materials, a tendency of unstable $Ni^{3+}$ to be reduced to stable $Ni^{2+}$ increases. This is because ion sizes of $Ni^{2+}$ and $Li^+$ are similar during firing, and due to a positive ion mixing phenomenon in which $Ni^{2+}$ moves to the $Li^+$ site and pushes $Li^+$ to the surface, NiO, which acts as a resistance component, is formed on the surface, thereby increasing resistance.

In the case of electric vehicles, driving characteristics of four seasons must be guaranteed, and particularly, in order to solve a problem that a starting is turned off when climbing a hill in an environment where a temperature goes down, such as winter, the need to lower initial resistance and a resistance increasing rate of a positive active material particularly among materials constituting the secondary battery is increased.

Therefore, it is urgent to develop a positive active material with improved initial resistance and resistance increase rate, and simultaneously providing an excellent lifetime characteristic and thermal stability.

DISCLOSURE

Technical Problem

One embodiment is to provide a positive active material for a lithium secondary battery that exhibits excellent electrochemical characteristics, such as improved cycle life characteristics and thermal safety, and reduced resistance.

Another embodiment is to provide a lithium secondary battery including the positive active material.

Technical Solution

According to one embodiment, a positive active material for a lithium secondary battery includes lithium, nickel, cobalt, manganese, and a doping element, wherein the doping element includes Zr, Al, and Ti.

The doping ratio of Zr may be 0.1 mol % to 0.5 mol % with respect to 100 mol % of nickel, cobalt, manganese, and the doping element. The doping ratio of Al may be 0.7 mol % to 3.3 mol % with respect to 100 mol % of nickel, cobalt, manganese, and the doping element. The doping ratio of Ti may be 0.05 mol % to 0.4 mol % with respect to 100 mol % of nickel, cobalt, manganese, and the doping element.

The doping element may further include W.

The doping ratio of W may be 0.03 mol % to 0.1 mol % with respect to 100 mol % of nickel, cobalt, manganese, and the doping element.

The positive active material for the lithium secondary battery may be represented by Chemical Formula 1 below.

$$Li_{a1}[Ni_{x1}Co_{y1}Mn_{z1}]_{t1}(Zr_{h1}Al_{g1}Ti_{u1})O_{2-p}X1_p \quad \text{[Chemical Formula 1]}$$

In Chemical Formula 1,

X1 is at least one element selected from a group including F, N, and P, a1 is $0.8 \le a1 \le 1.3$, t1 is $0.9580 \le t1 \le 0.9915$, and $0.6 \le x1 \le 0.95$, $0 < y1 \le 0.2$, $0 < z1 \le 0.2$, $0.0010 \le h1 \le 0.005$, $0.007 \le g1 \le 0.033$, $0.0005 \le u1 \le 0.004$, and $0 \le p \le 0.02$.

In detail, the positive active material for the lithium secondary battery may be represented by Chemical Formula 2 below.

$$Li_{a2}[Ni_{x2}Co_{y2}Mn_{z2}]_{t2}(Zr_{h2}Al_{g2}W_jTi_{u2})O_{2-p}X2_p \quad \text{[Chemical Formula 2]}$$

In Chemical Formula 2,

X2 is at least one element selected from a group including F, N, and P, a2 is $0.8 \le a2 \le 1.3$, t2 is $0.9570 \le t2 \le 0.9912$, and $0.6 \le x2 \le 0.95$, $0 < y2 \le 0.2$, $0 < z2 \le 0.2$, $0.001 \le h2 \le 0.005$, $0.007 \le g2 \le 0.033$, $0.0003 \le j \le 0.001$, $0.0005 \le u2 \le 0.004$, and $0 \le p \le 0.02$.

The positive active material for the lithium secondary battery may have a ratio I (003)/I (104) of a peak intensity on a 003 plane to a peak intensity on a 104 plane of 1.1 to 1.2 when measuring an X-ray diffraction pattern.

For the positive active material for the lithium secondary battery, when measuring an X-ray diffraction pattern, an a-axis length (La) may be 2.8500 Å to 2.8800 Å, a c-axis length (Lc) may be 14.1800 Å to 14.2900 Å, and a distance ratio (c/a) between a crystal axis of the c-axis length to an a-axis length may be 4.93 to 5.0.

For the positive active material for the lithium secondary battery when measuring an X-ray diffraction pattern, an average grain size (a crystalline size, Lc) may be 80 nm to 140 nm, and an R-factor value represented by Equation 1 may be 0.52 to 0.55.

$$\text{R-factor} = \{I\ 006 + I\ 102\}/I\ 101 \quad \text{[Equation 1]}$$

Another embodiment provides a lithium secondary battery including a positive electrode including: the positive active material; a negative electrode; and a non-aqueous electrolyte.

Advantageous Effects

The positive active material for the lithium secondary battery according to an embodiment may exhibit excellent electrochemical characteristics such as improved cycle lifespan characteristic and thermal safety, and reduced resistance.

MODE FOR INVENTION

Figure 1:
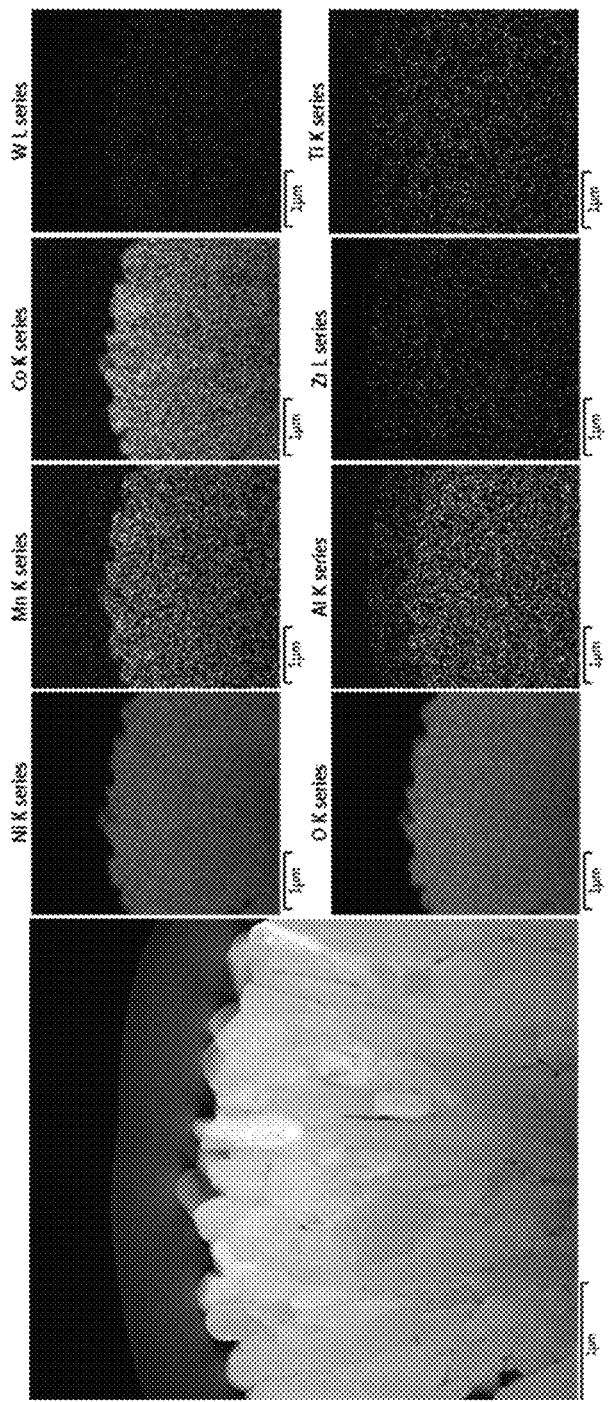
FIG. 1 is a cross-section EDS measurement photograph of a positive active material prepared according to a second embodiment.

Hereinafter, an embodiment of the present invention will be described in detail. However, the embodiment is illustrative only and is not to be construed to limit the present invention, and the present invention is defined by the scope of the claims as described below.

A positive active material for a lithium secondary battery according to an embodiment includes lithium, nickel, cobalt, manganese, and a doping element, and the doping element includes Zr, Al, and Ti.

In the positive active material, the doping ratio of Zr may be 0.1 mol % to 0.5 mol % with respect to 100 mol % of nickel, cobalt, manganese, and the doping element, and the doping ratio of Al may be 0.7 mol % to 3.3 mol % with respect to 100 mol % of nickel, cobalt, manganese, and the doping element. Also, the doping ratio of Ti may be 0.05 mol % to 0.4 mol % with respect to 100 mol % of nickel, cobalt, manganese, and the doping element.

A positive active material for a lithium secondary battery according to an embodiment in which the doping element has the above-described doping ratio may be expressed by Chemical Formula 1 below.

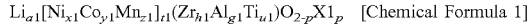

$$Li_{a1}[Ni_{x1}Co_{y1}Mn_{z1}]_{t1}(Zr_{h1}Al_{g1}Ti_{u1})O_{2-p}X1_p \quad \text{[Chemical Formula 1]}$$

In Chemical Formula 1,

X1 is at least one element selected from a group including F, N, and P, a1 is $0.8 \leq a1 \leq 1.3$, t1 is $0.9580 \leq t1 \leq 0.9915$, and $0.6 \leq x1 \leq 0.95$, $0 < y1 \leq 0.2$, $0 < z1 \leq 0.2$, $0.0010 \leq h1 \leq 0.005$, $0.007 \leq g1 \leq 0.033$, $0.0005 \leq u1 \leq 0.004$, and $0 \leq p \leq 0.02$.

As above-described, the doping ratio of Zr may be 0.1 mol % to 0.5 mol % with respect to 100 mol % of nickel, cobalt, manganese, and the doping element, and in detail, 0.2 mol % to 0.45 mol %, 0.2 mol % to 0.4 mol %, or 0.2 mol % to 0.35 mol %. When the doping ratio of Zr is the above-described range, excellent room temperature and high temperature cycle lifespan characteristics, and thermal stability may be obtained, and low initial resistance may be obtained. Also, the doping ratio of Al may be 0.7 mol % to 3.3 mol % with respect to 100 mol % of nickel, cobalt, manganese, and the doping element, and in detail, 0.7 mol % to 2.8 mol %, 0.7 mol % to 2.5 mol %, or 0.7 mol % to 2.0 mol %. When the doping ratio of Al is the above-described range, excellent capacity, thermal safety, and high temperature cycle lifespan characteristics may be exhibited, and a low resistance increase rate and average leakage current may also be exhibited.

Also, the doping ratio of Ti may be 0.05 mol % to 0.4 mol % with respect to 100 mol % of nickel, cobalt, manganese, and the doping element, and in detail, 0.05 mol % to 0.3 mol %, 0.1 mol % to 0.25 mol %, or 0.05 mol % to 0.2 mol %, and when the above-described range is included, the excellent discharge capacity, efficiency, room temperature, and high temperature cycle lifespan characteristics may be obtained, and the resistance increasing rate and average leakage current may be obtained.

In this way, when Zr, Al, and Ti are used as the doping elements in the positive active material, the lithium secondary battery applied with them exhibits the excellent discharge capacity, and simultaneously, initial efficiency, room temperature cycle lifespan, and high temperature cycle lifespan characteristics are improved. In addition, the low initial resistance, resistance increase rate, average leakage current, heating peak temperature, and heating value may be exhibited.

These effects are obtained when using a ternary doping element of Zr, Al, and Ti, and if any one of them is not included, the desired physical properties may not be obtained. For example, when only Zr is included, the effect of improving the average leakage current and the thermal stability is negligible. In addition, when only Zr and Al are included, the capacity is slightly reduced, and the effect of improving the average leakage current and initial resistance is insignificant.

In addition, as described above, the positive active material according to one embodiment is doped with the elements of Zr, Al, and Ti other than Ni, Co, and Mn, which are major elements constituting the positive active material, that is, not coating them onto the active material surface, that is, it is doped inside the positive active material.

That is, in the present embodiment, Zr, Ti, and Al among many elements known as doping elements are used as the doping element, and as these elements are used as the doping elements, structure stabilization is possible without reducing performance. Accordingly, the thermal peak appears at a higher temperature, that is, excellent thermal safety may be implemented.

Particularly, this effect may increase the binding force with oxygen by the doping element when doping the three elements into the ternary lithium intercalation compound including Ni, Co, and Mn, so that the safety may be increased. It may be maximized because there is no capacity loss due to the suppression of the movement of $Ni^{4+}$ ions into the Li layer.

Even if Zr, Al, and Ti elements are used as the doping element, the capacity is greatly reduced and the safety improvement hardly appears when using a cobalt series such as $LiCoO_2$, a nickel series such as $LiNiO_2$, and a manganese system such as $LiMnO_2$, this effect may not be achieved.

In addition, even if Zr is used as the main doping element like in Chemical Formula 1 as the doping element, if it is used in a quaternary element along with the elements such as Mg, Co, Ag, and Na, the capacity is significantly reduced and the cycle efficiency is greatly reduced, thereby it is not appropriate.

In the case of using Zr as the doping element, the a-axis length and the c-axis length of the active material are somewhat reduced as Zr is doped to the Li site in the Li layer of the positive active material, and thus the initial efficiency and electrochemical properties may be improved overall.

In addition, when Zr and Al are doped together, the layered structure may be stabilized, and thus the-axis length may be further reduced and the c-axis length may be increased. Due to the stabilization of the layered structure, positive ion mixing or a spinel-phase transition phenomenon caused by $Ni^{2+}$ can be suppressed. Particularly, the average grain size is greatly reduced, so that the mechanical characteristic may be improved and the cycle characteristic may be partially improved. In addition, it may be confirmed that the stability of the lithium secondary battery is improved and a differential scanning calorimetry (DSC) peak temperature is greatly improved. However, in the case of doping only Zr and Al, that is, doping the binary element of Zr and Al, a positive ion mixing index (a cation mixing index) of I (003)/I (104) value is reduced, and an R-factor is also greatly reduced from an appropriate range. As a result, the initial capacity and rate-dependent characteristics of the active material may be deteriorated.

Here, the R-factor is a value defined as Equation 1 below, and the decreasing in the R-factor value promotes grain enlargement in the positive active material with a high Ni content, which causes the electrochemical performance of the lithium secondary battery to be reduced. This means that when the positive active material has an appropriate range R-factor, the lithium secondary battery with excellent performance may be implemented.

$$R\text{-factor} = \{I006 + I\ 102\}/I\ 101 \quad \text{[Equation 1]}$$

Meanwhile, the positive active material for the lithium secondary battery according to the present embodiment may further include W as the doping element. At this time, the doping ratio of W may be 0.03 mol % to 0.1 mol % with respect to 100 mol % of nickel, cobalt, manganese, and the doping element.

The positive active material for the lithium secondary battery according to an embodiment further including W as the doping element may be represented by Chemical Formula 2 below.

[Chemical Formula 2]

In Chemical Formula 2,

X2 is at least one element selected from a group including F, N, and P, a2 is $0.8 \leq a2 \leq 1.3$, t2 is $0.9570 \leq t2 \leq 0.9912$, and $0.6 \leq x2 \leq 0.95$, $0 < y2 \leq 0.2$, $0 < z2 \leq 0.2$, $0.001 \leq h2 \leq 0.005$, $0.007 \leq g2 \leq 0.033$, $0.0003 \leq j2 \leq 0.001$, $0.0005 \leq u2 \leq 0.004$, and $0 \leq p \leq 0.02$.

The doping ratio of W may be 0.03 mol % to 0.1 mol % with respect to 100 mol % of nickel, cobalt, manganese, and the doping element, and in detail, 0.03 mol % to 0.06 mol % or 0.03 mol % to 0.05 mol %. In this way, when W as the doping element is further included in the doping ratio range as described above, the capacity of the lithium secondary battery to which the positive active material according to the present embodiment is applied may be further improved. In addition, in the case of further including W as described above, the discharge capacity is further increased, and the average leakage current is also improved, which has a very advantageous effect.

In addition, when Ti and W are additionally doped together with Zr and Al, the positive ion mixing index value and R-factor value may be improved. When Ti and W are added as the doping element, the a-axis length contracted by the Al doping is increased, thereby mitigating the movement and structure of Li ions, and increasing the conductivity of Li ions. Accordingly, when the positive active material of the present embodiment is applied, the initial resistance of the lithium secondary battery may be improved and the charging and discharging characteristics may be greatly improved.

That is, a basic physical property may be improved through Zr, structural stability may be greatly improved through the Al doping, and the initial resistance and initial efficiency may be greatly improved through the ion conductivity improvement by doping W and Ti.

When the binary element of Zr and Al is used as the doping element, the capacity may decrease, and when the binary element of Zr and W is used, safety may be deteriorated.

In addition, in the case of using the binary element of Zr and Ti, the capacity may decrease, and in the case of using the binary element of Al and W, sintering must be carried out at a very high temperature, so the positive ion mixing (the cation mixing) occurs, and the performance is significantly deteriorated, thereby it is not appropriate.

In addition, in the case of the binary element of W and Ti, a problem of the capacity deterioration occurs, and in the case of the ternary element of Zr, Al, and W, safety may be deteriorated, and in the case of the ternary system of Al, W, and Ti, the initial capacity is deteriorated and it is not appropriate.

That is, when the quaternary element of Zr, Ti, W, and Al is used as the doping element, the structure of the positive active material may be stabilized, and the thermal stability of the lithium secondary battery to which it is applied may be remarkably improved.

In this specification, the X-ray diffraction pattern measurement is measured using a CuKα ray as a target ray.

In the case of the positive active material for the lithium secondary battery according to an embodiment, when measuring an X-ray diffraction pattern, I (003)/I (104), which is a ratio of the peak intensity of (003) surface to the peak intensity of the (104) surface, may be 1.1 to 1.2.

In general, the peak intensity value means an integral area value obtained by integrating a height value of the peak or the area of the peak, and the peak intensity value according to an embodiment means the area value of the peak.

When the peak intensity ratio I (003)/I (104) is included in the above range, the structure stabilization may be improved without a decrease in capacity, and the safety may be improved, and if it is less than 1.1, the capacity is greatly reduced and it is not appropriate, while if it exceeds 1.2, the capacity is improved due to the improvement of the positive ion mixing (cation mixing) phenomenon, but the safety is reduced, which is not appropriate.

The positive active material for the lithium secondary battery, when measuring the X-ray diffraction pattern, may have the a-axis length (La) of 2.8500 Å to 2.8800 Å, the c-axis length (Lc) of 14.1800 Å to 14.2900 Å, and a distance ratio (c/a) between the crystal axes of the c-axis length to the axis length may be 4.93 to 5.0. When the a-axis length (La) and the c-axis length (Lc) are included in the above range, the safety is improved without reducing capacity, so it is appropriate. If the a-axis length (La) is less than 2.8500 Å, the capacity may be reduced, if it exceeds 2.8800 Å, the safety may be reduced, and if the c-axis length (Lc) is less than 14.1800 Å, the rate-dependent characteristics may be reduced, and if it exceeds 14.2900 Å, the safety may be reduced. In addition, while the a-axis length (La) and the c-axis length (Lc) are included in the range, when the distance ratio (c/a) between the crystal axes of the c-axis length to the a-axis length is 4.93 to 5.0, the safety may be improved in the state that the capacity, the rate-dependent characteristics, and cycle characteristic are similar, and when it is less than 4.93, the capacity and the rate-dependent characteristics may be reduced, while when it exceeds 5.0, the safety may be reduced.

The positive active material for the lithium secondary battery may have a grain size (a crystalline size, Lc) of 98 nm to 135 nm when measuring the X-ray diffraction pattern. When the grain size is included in the above range, the capacity retention and rate-dependent characteristics may be improved, if it is less than 98 nm, the rate-dependent characteristics may be deteriorated, and when it exceeds 135 nm, the capacity retention rate may be deteriorated.

In addition, the positive active material for the lithium secondary battery may have an R-factor value of 0.52 to 0.55. The R-factor is called a hexagonal order, and the smaller the value is, the higher the hexagonal order in the structure, where the R-factor value of 0.52 to 0.55 indicates a somewhat increased developed hexagonal order and means that the layered structure is stabilized. In addition, when the R-factor value is included in the above range, it may represent the improved rate-dependent characteristic.

In one embodiment, the positive active material for the lithium secondary battery may include secondary particles in which at least one primary particle is agglomerated.

The secondary particle may include a core portion and a shell portion, and may have a structure without a distinction between the core portion and the shell portion. Here, the structure without the distinction between the core portion and the shell portion means that nickel concentrations in the core portion and the shell portion are substantially similar, so that the composition of the core portion and the shell portion is substantially indistinguishable.

When the secondary particles include the core portion and the shell portion, the nickel concentrations in the core portion and the shell portion may be different from each other. In this case, the nickel concentration of the shell portion may be lower by about 4 mol % to 6 mol % compared to 100 mol % of the nickel concentration of the core portion.

According to another embodiment, the secondary particle may include a core portion where the molar content of nickel is constant and a shell portion surrounding the outer surface of the core portion and having a concentration gradient in which the molar content of nickel gradually decreases in a direction to the outermost from the boundary surface with the core portion, that is, thereby having a core-shell concentration gradient ("CSG"). As such, if the primary particle has the core-shell concentration gradient, since the core portion maintains a high nickel content, the high-capacity according to the high nickel content may be obtained, while in the shell portion, since the content of nickel gradually decreases, that is, the content of M selectively increases with Mn and Co other than nickel, the structural stability may be further improved.

The positive active material is to include the secondary particle of which the primary particles are agglomerated, that is, at least one primary particle is agglomerated, an average particle diameter D50 of the secondary particle may be 7 μm to 20 μm, and if the average particle diameter D50 of the secondary particle is included in the range, it is appropriate because a filling density may be further improved. The average particle diameter D50 of the primary particle is smaller than that of the secondary particle and may be appropriately adjusted, and does not need to be specifically limited.

In addition, the positive active material may consist of only secondary particles having the above average particle diameter D50, or may be in a bi-modal form in which large-particle diameter particles and small-particle diameter particles are mixed. When the positive active material is the bi-modal form, the average particle diameter D50 of the large-particle diameter particles may be 10 μm to 20 μm, and the small-particle diameter particles may have an average particle diameter D50 of 3 μm to 7 μm. At this time, it goes without saying that the large-particle diameter particles and the small-particle diameter particles may also be in the form of the secondary particles in which at least one primary particle is agglomerated. In addition, the mixing ratio of the large-particle diameter particle and the small-particle diameter particles may be 50 to 80 wt % of the large-particle diameter particles based on the entire 100 wt %. Due to this bi-modal particle distribution, an energy density may be improved.

In one embodiment, a coating layer positioned on the secondary particle surface of the positive active material may be further included. The coating layer may include boron, boron oxide, lithium boron oxide, or a combination thereof. However, this is only an example, and various coating materials used for the positive active materials may be used. In addition, the content and thickness of the coating layer may be appropriately adjusted, and there is no need to specifically limit it.

Another embodiment provides a lithium secondary battery including a positive electrode, a negative electrode, and a non-aqueous electrolyte, and the positive electrode includes the positive active material according to the above-described embodiment.

The positive electrode includes a positive active material layer disposed on a positive electrode current collector. The positive active material layer includes a positive active material, and the positive active material may include the positive active material for the lithium secondary battery according to the above-described embodiment.

In the positive active material layer, the content of the positive active material may be 90 wt % to 98 wt % with respect to the entire weight of the positive active material layer.

In an embodiment, the positive active material layer may further include a binder and a conductive material. In this case, the content of the binder and conductive material may be 1 wt % to 5 wt %, respectively, with respect to the entire weight of the positive active material layer.

The binder serves to well adhere the positive electrode active material particles to each other and to well adhere the positive electrode active material to the current collector. A representative example of the binder may be polyvinyl alcohol, carboxymethylcellulose, hydroxypropyl cellulose, diacetyl cellulose, polyvinyl chloride, carboxylated polyvinyl chloride, polyvinyl fluoride, polymer including ethylene oxide, polyvinylpyrrolidone, polyurethane, polytetrafluoroethylene, polyvinylidene fluoride, polyethylene, polypropylene, styrene-butadiene rubber, acryl federated styrene-butadiene rubber, epoxy resin, and nylon, but it is not limited thereto.

The conductive material is used to provide conductivity to the electrode, and in the configured battery, any material may be used as an electron conductive material as long as it does not cause a chemical change. An example of the conductive material may be a carbon-containing material such as a natural graphite, an artificial graphite, carbon black, acetylene black, ketjen black, carbon fiber, etc; a metal powder such as copper, nickel, aluminum, silver, and the like, or a metal-containing material such as a metal fiber and the like; a conductive polymer such as a polyphenylene conductor and the like; or a conductive material including a mixture thereof.

As the positive electrode current collector, an aluminum foil, a nickel foil, or combinations thereof may be used, but is not limited thereto.

The negative electrode includes a current collector and a negative electrode active material layer formed on the current collector, and the negative electrode active material layer includes a negative electrode active material.

As the negative electrode active material, a material that can perform reversible intercalation and deintercalation of lithium ions, a lithium metal, an alloy of the lithium metal, a material doping or de-doping lithium, or a transition metal oxide may be used.

As a carbon-based material of the material that can perform reversible intercalation and deintercalation of lithium ions, any generally-used carbon-based negative active material may be used in a lithium ion secondary battery, and as representative examples, crystalline carbon, amorphous carbon, or a combination thereof may be used.

The alloy of the lithium metal may be a metal alloy of lithium and one selected from a group including Na, K, Rb, Cs, Fr, Be, Mg, Ca, Sr, Si, Sb, Pb, In, Zn, Ba, Ra, Ge, Al, and Sn.

As the material doping and de-doping the lithium, Si, SiOx (0<x<2), a Si-Q alloy (Q is an alkali metal, an alkali earth metal, a group 13 element, a group 14 element, a transition metal, a rare earth element, or a combination thereof, and is not Si), a Si—C composite, or a Si-based compound of a combination thereof; Sn, SnO2, Sn—Y (Y is an alkali metal, an alkali earth metal, a group 13 element, a group 14 element, a transition metal, a rare earth element, or a combination thereof, and is not Sn), or a Sn-based compound of a combination thereof; or a combination thereof, may be used As the transition metal oxide, a vanadium oxide, a lithium vanadium oxide, or a titanium oxide may be used. The negative active material layer also includes a binder, and may further selectively include a conductive material.

The binder serves to bind negative electrode active material particles to each other well, and bind a negative electrode active material to a current collector well.

The conductive material is used to provide conductivity to an electrode, and any electronically conductive material that does not cause a chemical change in a battery may be used.

The current collector of the negative electrode may be at least one selected from the group consisting of a copper foil, a nickel foil, a stainless steel foil, a titanium foil, a nickel foam, a copper foam, a polymer substrate coated with a conductive metal, or a combination thereof.

For manufacturing the negative electrode and the positive electrode, the active material, the binder, and the conductive material are mixed in a solvent to manufacture an active material composition, and the composition is coated to the current collector such that the positive electrode and the negative electrode are respectively manufactured. Such a manufacturing method is well known to a person skilled in the art, and therefore no further detailed description will be provided. As the solvent, N-methylpyrrolidone may be used, but it is not restrictive.

The electrolyte includes a non-aqueous organic solvent and a lithium salt.

The non-aqueous organic solvent serves as a medium through which ions involved in an electrochemical reaction of a battery may move.

The lithium salt is dissolved in the organic solvent to act as a lithium ion supply source in the battery, thereby enabling a basic operation of a lithium secondary battery and promoting the movement of lithium ions between a positive electrode and a negative electrode.

A separator may be disposed between the positive electrode and the negative electrode depending on the kind of the lithium secondary battery. As the separator, polyethylene, polypropylene, polyvinylidene fluoride, or a multilayer of two or more layers thereof may be used, or a mixed multilayer such as a polyethylene/polypropylene two layer separator, a polyethylene/polypropylene/polyethylene three layer separator, and a polypropylene/polyethylene/polypropylene three layer separator may also be used.

The lithium secondary battery may be classified into a lithium ion battery, a lithium ion polymer battery, and a lithium polymer battery according to a kind of the separator and the electrolyte used in the battery, and may be formed with a cylindrical shape, a square shape, a coin shape, a pouch shape, and the like, and may be divided into a bulk type and a thin film type according to a size. The structure and manufacturing method of the battery are well known in the art, thus the detailed description thereof will be omitted.

Next, an embodiment of the present invention and a comparative example are disclosed. Such an embodiment is only an embodiment of the present invention, and the present invention is not limited to an embodiment below.

Preparation Example 1

Large-Particle Diameter Active Material Hydroxide Precursor

1) Preparation of Metal Salt Solution

First, two metal salt aqueous solutions having different Ni, Co, and Mn concentrations were prepared by using $NiSO_4 \cdot 6H_2O$ as a raw material of nickel, $CoSO_4 \cdot 7H_2O$ as a raw material of cobalt, and $MnSO_4 \cdot H_2O$ as a raw material of manganese.

The first metal salt aqueous solution for forming the core portion was prepared by mixing the respective raw materials so as to satisfy the stoichiometric molar ratio of $(Ni_{0.98}Co_{0.01}Mn_{0.01})(OH)_2$ in distilled water.

Independently, the second metal salt aqueous solution for forming the shell portion was prepared by mixing the respective raw materials so as to satisfy the stoichiometric molar ratio of $(Ni_{0.64}Co_{0.23}Mn_{0.13})(OH)_2$ in distilled water.

2) Co-Precipitation Process

A co-precipitation reactor in which two metal salt aqueous solution supply tanks are connected in series was prepared, and the first metal salt aqueous solution and the second metal salt aqueous solution were charged into respective metal salt aqueous solution supply tanks.

Distilled water was placed in the co-precipitation reactor and stirred while maintaining a temperature of the reactor.

In addition, $NH_4(OH)$ was used as a chelating agent, a NaOH solution of 0.1 was used as a pH regulator, and at this time, the amount thereof was appropriately controlled so as to be maintained at pH 11.3 in the reactor during the process.

In the reactor in which the pH was kept constant and the chelating agent was supplied, from two metal salt aqueous solution supply tanks connected in series to the reactor, an impregnation rate of the reactor was adjusted to 140 rpm while introducing the first metal salt aqueous solution at 0.4 L/h, and the co-precipitation reaction was performed until a diameter of a precipitate became about 11.1 μm. In this case, an average residence time of the solution in the reactor was adjusted to about 10 hours by adjusting a flow rate, and a co-precipitation compound having a slightly higher density was obtained by giving a steady state duration to the reactant after the reaction reached the steady state.

Next, while changing the mixing ratio of the first metal salt aqueous solution and the second metal salt aqueous solution, the entire supply solution was injected at 0.5 L/h, and the supply rate of the first metal salt aqueous solution was supplied and started at 0.5 L/h and gradually decreased to 0.05 L/h, and the supply rate of the second metal salt aqueous solution was supplied at 0.5 L/h. At this time, the average residence time of the solution in the reactor was adjusted to 20 h or less by controlling the flow rate, and finally the co-precipitation reaction was performed until the diameter of the precipitate became 14.8 μm.

3) Post-Treatment Process

The precipitate obtained by the series of co-precipitation steps was filtered, washed with water, and then dried in an oven at 100° C. for 24 h to obtain a plurality of large-particle diameter particles of which a composition in the whole particles was $(Ni_{0.88}Co_{0.09}Mn_{0.03})(OH)_2$ and the average particle diameter was 15 μm as a preparation of a large-particle diameter active material precursor.

Preparation Example 2

A Small-Particle Diameter Positive Active Material Hydroxide Precursor

1) Preparation of Metal Salt Solution

The same first aqueous metal salt solution and second aqueous metal salt solution as in Preparation Example 1 were prepared.

2) Co-Precipitation Process

Using the same reactor as in Preparation Example 1, the other conditions were the same and a charging time and charging amount of each metal salt solution were varied.

Specifically, the impregnation rate of the reactor was adjusted to 140 rpm while introducing the first metal salt aqueous solution at a rate of 0.3 L/h, and a co-precipitation reaction was performed until the diameter of the precipitate became approximately 3.7 μm. At this time, the flow rate was adjusted so that the average residence time of the solution in the reactor was about 15 hours. After the reaction reached a steady state, the steady state duration was given to the reactant to obtain a denser co-precipitated compound.

Subsequently, the total supply solution was fed at 0.5 L/h while changing the mixing ratio of the first metal salt aqueous solution and the second metal salt aqueous solution, the supply rate of the the first metal salt aqueous solution started and was supplied with 0.5 L/h and gradually decreased to 0.05 L/h, and the second metal salt aqueous solution was supplied with the supply rate of 0.5 L/h. At this time, the average residence time of the solution in the reactor was controlled to be within 15 h by adjusting the flow rate, and the co-precipitation reaction was performed until the diameter of the precipitate finally reached 5.0 μm.

3) Post-Treatment Process

The precipitate obtained according to the series of co-precipitation steps was filtered, washed with water, and then dried in an oven at 100° C. for 24 h to obtain a small-particle diameter hydroxide active material precursor of which a composition in the whole particles is $(Ni_{0.88}Co_{0.09}Mn)_{0.03}(OH)_2$ and an average particle diameter is 5 μm was obtained.

Preparation Example 3

A Large-Particle Diameter Oxide Precursor Preparation

A precursor having a large-particle diameter $(Ni_{0.88}Co_{0.09}Mn_{0.03})(OH)_2$ composition having a core-shell concentration gradient prepared in Preparation Example 1 was charged into a heat treatment furnace and a heat treatment was performed while an air atmosphere was inflowed at 200 mL/min to prepare a porous $Ni_{0.88}Co_{0.09}Mn_{0.03}O_2$ oxide precursor having a large-particle diameter. The heat treatment process was carried out as a process of heating up to 700° C. at a temperature rising speed of 2.5° C./min and then maintaining at 700° C. for 5 hours.

Preparation Example 4

Small-Particle Diameter Oxide Precursor Preparation

A precursor having a small-particle diameter $(Ni_{0.88}Co_{0.09}Mn_{0.03})(OH)_2$ composition having a core-shell concentration gradient prepared in Preparation Example 2 was charged into a heat treatment furnace and a heat treatment was performed while an air atmosphere was inflowed at 200 mL/min to prepare a porous $Ni_{0.88}Co_{0.09}Mn_{0.03}O_2$ oxide precursor having a small-particle diameter. The heat treatment process was carried out as a process of heating up to 700° C. at a temperature rising speed of 2.5° C./min and then maintaining at 700° C. for 5 hours.

Embodiment 1

1) Large-Particle Diameter Active Material Preparation

The large-particle diameter porous $Ni_{0.88}Co_{0.09}Mn_{0.03}O_2$ oxide precursor, $LiOH \cdot H_2O$ (battery grade), $ZrO_2$ (Aldrich, 4N), $Al_2O_3$ (Aldrich, 3N) and $TiO_2$ (Aldrich, 3N) were uniform mixed to prepare a mixture. At this time, a mixing ratio was expressed as $M=Ni_{0.88}Co_{0.09}Mn_{0.03}$ based on $LiNi_{0.88}Co_{0.09}Mn_{0.03}O_2$ that is not doped with a metal element, A charged amount of a doping element-containing source was adjusted so that the total sum of M and the doped elements becomes 1 mol, that is, Zr is 0.003 mol, Al is 0.017 mol, and Ti is 0.002 mol to obtain $Li(Ni_{0.88}Co_{0.09}Mn_{0.03})_{0.978}Zr_{0.003}Al_{0.017}Ti_{0.002}O_2$.

The mixture is charged into the tube (a tube furnace, an interior diameter 50 mm, a length 1000 mm) and sintered while oxygen is inflowed at 200 mL/min. In this firing process, the primary heat treatment was performed at 480° C. for 5 hours, the temperature was raised to 760° C. at a heating peed of 5° C./min, then maintained at this temperature for 16 hours, and then the product on which the firing process was carried out was naturally cooled to 25° C.

Subsequently, the cooled product was washed with water to remove residual lithium on the surface, $H_3BO_3$ was dry-mixed, and the mixture was maintained at 350° C. for 5 hours to prepare a positive active material. The prepared positive active material was a large-particle diameter positive active material that is the secondary particle with an average particle diameter D50 of 15 μm in which B was coated on the surface and the primary particle with an average particle diameter D50 of 130 nm was agglomerated.

The entire composition of the prepared large-particle diameter active material was $Li(Ni_{0.88}Co_{0.09}Mn_{0.03})_{0.978}Zr_{0.003}Al_{0.017}Ti_{0.002}O_2$.

2) Small-Particle Diameter Active Material Preparation

The same process as that of 1) was performed by using a small-particle diameter oxide precursor instead of the large-particle diameter oxide precursor to prepare a small-particle diameter active material that is the secondary particle with an average particle diameter D50 of 5.0 μm in which B was coated on the surface and the primary particle with an average particle diameter D50 of 90 nm was agglomerated. The entire composition of the prepared small-particle diameter active material was $Li(N_{0.88}Co_{0.09}Mn_{0.03})_{0.978}Zr_{0.003}Al_{0.017}Ti_{0.002}O_2$.

3) Active Material Preparation

The prepared large-particle diameter active material and small-particle diameter active material were mixed at an 8:2 weight ratio to prepare a final positive active material.

4) Half Cell Preparation

The prepared final positive active material, polyvinylidene fluoride, the binder (brand name: KF1100) and a DENKA black conductive material were mixed at a weight ratio of 92.5:3.5:4, and this mixture was added to an N-methyl-2-pyrrolidone solvent so that a solid content was about 30 wt % to prepare a positive active material slurry.

The slurry was coated on an Al foil (thickness: 15 μm) current collector using a doctor blade, dried, and then rolled to prepare a positive electrode. The loading amount of the positive electrode was 14.6 mg/cm$^2$, and the rolling density was 3.1 g/cm$^3$.

The positive electrode, the lithium metal negative electrode (thickness 200 μm, Honzo metal), the electrolyte solution, and a polypropylene separator were used to prepare a 2032 coin-type half-cell by a typical method. As the electrolyte solution, a mixed solvent (a mixing ratio of 1:1 volume %) of ethylene carbonate in which 1 M LiPF$_6$ was dissolved and dimethyl carbonate was used.

Embodiment 2

In the large-particle diameter and small-particle diameter active material, except that the doping element of WO$_3$ (Aldrich, 3N) was added and the content was adjusted so that the doping ratio of W became 0.0005, the large-particle diameter active material and the small-particle diameter active material were prepared like in Embodiment 1, and they were mixed at 8:2 to prepare the positive active material. In the prepared large-particle diameter and small-particle diameter active material, the entire composition was Li(Ni$_{0.88}$Co$_{0.09}$Mn$_{0.03}$)$_{0.9805}$Zr$_{0.003}$Al$_{0.017}$W$_{0.0005}$Ti$_{0.002}$O$_2$.

Using the prepared positive active material, a coin-type half cell was prepared in the same method as in Embodiment 1.

Embodiment 3

In the large-particle diameter and small-particle diameter active materials, except for adjusting a content of Al$_2$O$_3$ (Aldrich, 3N) so that an Al doping ratio became 0.014, the same process as in Embodiment 1 was performed to prepare the large-particle diameter active material and the small-particle diameter active material, and they were mixed at 8:2 to prepare the positive active material. In the prepared large-particle diameter and small-particle diameter active materials, the entire composition was Li(Ni$_{0.88}$Co$_{0.09}$Mn$_{0.3}$)$_{0.9805}$Zr$_{0.003}$Al$_{0.014}$W$_{0.0005}$Ti$_{0.002}$O$_2$.

Using the prepared positive active material, a coin-type half cell was prepared in the same method as in Embodiment 1.

Embodiment 4

In the large-particle diameter and small-particle diameter active materials, except for adjusting a content of Al$_2$O$_3$ (Aldrich, 3N) so that an Al doping ratio became 0.01, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was Li(Ni$_{0.88}$Co$_{0.09}$Mn$_{0.03}$)$_{0.9845}$Zr$_{0.003}$Al$_{0.010}$W$_{0.0005}$Ti$_{0.002}$O$_2$.

Using the prepared positive active material, a coin-type half cell was prepared in the same method as in Embodiment 1.

Embodiment 5

In the large-particle diameter and small-particle diameter active materials, except for adjusting a content of Al$_2$O$_3$ (Aldrich, 3N) so that an Al doping ratio became 0.007, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was Li(Ni$_{0.88}$Co$_{0.09}$Mn$_{0.03}$)$_{0.9875}$Zr$_{0.003}$Al$_{0.007}$W$_{0.0005}$Ti$_{0.002}$O$_2$.

Using the prepared positive active material, a coin-type half cell was prepared in the same method as in Embodiment 1.

Embodiment 6

In the large-particle diameter and small-particle diameter active materials, except for adjusting a content of Al$_2$O$_3$ (Aldrich, 3N) so that an Al doping ratio became 0.025, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was Li(Ni$_{0.88}$Co$_{0.09}$Mn$_{0.03}$)$_{0.9695}$Zr$_{0.003}$Al$_{0.025}$W$_{0.0005}$Ti$_{0.002}$O$_2$.

Using the prepared positive active material, a coin-type half cell was prepared in the same method as in Embodiment 1.

Embodiment 7

In the large-particle diameter and small-particle diameter active materials, except for adjusting a content of Al$_2$O$_3$ (Aldrich, 3N) so that an Al doping ratio became 0.03, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was Li(Ni$_{0.88}$Co$_{0.09}$Mn$_{0.03}$)$_{0.9645}$Zr$_{0.003}$Al$_{0.030}$W$_{0.0005}$Ti$_{0.002}$O$_2$.

Using the prepared positive active material, a coin-type half cell was prepared in the same method as in Embodiment 1.

Embodiment 8

In the large-particle diameter and small-particle diameter active materials, except for adjusting a content of Al$_2$O$_3$ (Aldrich, 3N) so that an Al doping ratio became 0.033, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was Li (Ni$_{0.88}$Co$_{0.09}$Mn$_{0.03}$)$_{0.9615}$Zr$_{0.003}$Al$_{0.033}$W$_{0.0005}$Ti$_{0.002}$O$_2$.

Using the prepared positive active material, a coin-type half cell was prepared in the same method as in Embodiment 1.

Embodiment 9

In the large-particle diameter and small-particle diameter active materials, except for adjusting a content of $ZrO_2$ (Aldrich, 4N) so that an Zr doping ratio became 0.004, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.9765}Zr_{0.004}Al_{0.017}W_{0.0005}Ti_{0.002}O_2$.

Using the prepared positive active material, a coin-type half cell was prepared in the same method as in Embodiment 1.

Embodiment 10

In the large-particle diameter and small-particle diameter active materials, except for adjusting a content of $ZrO_2$ (Aldrich, 4N) so that a Zr doping ratio became 0.002, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.9785}Zr_{0.002}Al_{0.017}W_{0.0005}Ti_{0.002}O_2$.

Using the prepared positive active material, a coin-type half cell was prepared in the same method as in Embodiment 1.

Embodiment 11

In the large-particle diameter and small-particle diameter active materials, except for adjusting a content of $WO_3$ (Aldrich, 3N) so that a W doping ratio became 0.001, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.977}Zr_{0.003}Al_{0.017}W_{0.001}Ti_{0.002}O_2$.

Using the prepared positive active material, a coin-type half cell was prepared in the same method as in Embodiment 1.

Embodiment 12

In the large-particle diameter and small-particle diameter active materials, except for adjusting a content of $WO_3$ (Aldrich, 3N) so that a W doping ratio became 0.0008, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.977}Zr_{0.003}Al_{0.017}W_{0.0008}Ti_{0.002}O_2$.

Using the prepared positive active material, a coin-type half cell was prepared in the same method as in Embodiment 1.

Embodiment 13

In the large-particle diameter and small-particle diameter active materials, except for adjusting a content of $WO_3$ (Aldrich, 3N) so that a W doping ratio became 0.0003, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.9777}Zr_{0.003}Al_{0.017}W_{0.0003}Ti_{0.002}O_2$.

Using the prepared positive active material, a coin-type half cell was prepared in the same method as in Embodiment 1.

Embodiment 14

In the large-particle diameter and small-particle diameter active materials, except for adjusting a content of $WO_3$ (Aldrich, 3N) so that a Ti doping ratio became 0.004, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.9755}Zr_{0.003}Al_{0.017}W_{0.0005}Ti_{0.004}O_2$.

Using the prepared positive active material, a coin-type half cell was prepared in the same method as in Embodiment 1.

Embodiment 15

In the large-particle diameter and small-particle diameter active materials, except for adjusting a content of $WO_3$ (Aldrich, 3N) so that a Ti doping ratio became 0.001, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.9785}Zr_{0.003}Al_{0.017}W_{0.0005}Ti_{0.001}O_2$.

Using the prepared positive active material, a coin-type half cell was prepared in the same method as in Embodiment 1.

Embodiment 16

In the large-particle diameter and small-particle diameter active materials, except for adjusting a content of $WO_3$ (Aldrich, 3N) so that a Ti doping ratio became 0.005, the same process as in Embodiment 1 was performed to prepare the large-particle diameter active material and small-particle diameter active material, and they were mixed at 8:2 to prepare the positive active material. In the prepared large-particle diameter and small-particle diameter active material, the entire composition was $Li(Ni_{0.88}Co_{0.09}Mn_{0.03})_{0.979}Zr_{0.003}Al_{0.017}W_{0.0005}Ti_{0.0005}O_2$.

Using the prepared positive active material, a coin-type half cell was prepared in the same method as in Embodiment 1.

Embodiment 17

1) Preparation of a Large-Particle Diameter Precursor and Large-Particle Diameter Active Material First, a metal salt aqueous solution was prepared using $NiSO_4 \cdot 6H_2O$ as a nickel raw material, $CoSO_4 \cdot 7H_2O$ as a cobalt raw material, and $MnSO_4 \cdot H_2O$ as a manganese raw material and charged into a metal salt supply tank.

A co-precipitation reactor was prepared, distilled water was added to the co-precipitation reactor, and the reactor was stirred while maintaining a constant temperature.

Also, $NH_4(OH)$ was used as a chelating agent, a NaOH solution of 0.1 was used as a pH regulator, and during the process, an input amount was properly adjusted so that the pH in the reactor was maintained at 11.3.

In the reactor where the pH was maintained and the chelating agent was supplied, the metal salt aqueous solution was injected at 0.5 L/h from the metal salt aqueous solution supply tank connected to the reactor, and the impregnation rate of the reactor was adjusted to 160 rpm, thus, the co-precipitation reaction was carried out until the diameter of the precipitate became about 14.7 µm. At this time, the flow rate was adjusted so that the average residence time of the solution in the reactor was about 20 hours.

The precipitate obtained according to the co-precipitation process was filtered, washed with water, and dried in an oven at 100° C. for 24 hours, and a large-particle diameter active material precursor having the composition of the entire particle of $(Ni_{0.88}Co_{0.09}Mn_{0.03}, OH)_2$ and an average particle diameter of about 15.2 µm was prepared. Next, the precursor was charged into a heat treatment furnace and an air atmosphere was inflowed at 200 mL/min, and heat treatment was performed to prepare a porous $Ni_{0.88}Co_{0.09}Mn_{0.03}O_2$ oxide precursor. Next, using the large-particle diameter oxide precursor, a large-particle diameter active material was prepared in the same method as that of 1) of Embodiment 1.

The entire composition of the prepared large-particle diameter active material was $Li(Ni_{0.88}Co_{0.09}Mn_{0.03})_{0.978}Zr_{0.003}Al_{0.017}Ti_{0.002}O_2$.

2) Preparation of a Small-Particle Diameter Precursor and Small-Particle Diameter Active Material A small-particle diameter active material precursor having a composition of $(Ni_{0.88}Co_{0.09}Mn_{0.03})(OH)_2$ and an average particle diameter of 4.8 µm was prepared by the same method as that of 1), except for performing the co-precipitation reaction until the diameter of the precipitate became 4.7 µm by adjusting the injection speed of the metal salt aqueous solution and the impregnation rate of the co-precipitation reactor in the co-precipitation process.

Next, the small-particle diameter active material was prepared by the same method as 1) using the precursor. The entire composition of the prepared small-particle diameter active material was $Li(Ni_{0.88}Co_{0.09}Mn_{0.03})_{0.978}Zr_{0.003}Al_{0.017}Ti_{0.002}O_2$.

3) Active Material Preparation

The prepared large-particle diameter active material and small-particle diameter active material were mixed at an 8:2 weight ratio to prepare a final positive active material.

4) Half-Cell Preparation

The prepared final positive active material, polyvinylidene fluoride, the binder (brand name: KF1100), and a DENKA black conductive material were mixed at a weight ratio of 92.5:3.5:4, and this mixture was added to an N-methyl-2-pyrrolidone solvent so that a solid content was about 30 wt % to prepare a positive active material slurry.

The slurry was coated on an Al foil (thickness: 15 µm) current collector using a doctor blade, and dried and rolled to prepare a positive electrode. The loading amount of the positive electrode was 14.6 mg/cm$^2$, and the rolling density was 3.1 g/cm$^3$.

The positive electrode, a lithium metal negative electrode (a thickness of 200 µm, Honzo metal), an electrolyte solution, and a polypropylene separator were used to prepare a 2032 coin-type half cell by a typical method. As the electrolyte solution, a mixed solvent (mixing ratio of 1:1 volume %) of ethylene carbonate in which 1 M $LiPF_6$ was dissolved, and dimethyl carbonate was used.

Comparative Example 1

Except that $ZrO_2$ (Aldrich, 4N), $Al_2O_3$ (Aldrich, 3N), $TiO_2$ (Aldrich, 3N), and $WO_3$ (Aldrich, 3N) were not used, the process was carried out in the same manner as in Embodiment 1 to prepare a large-particle diameter active material and a small-particle diameter active material, and and a positive active material was prepared by mixing them at 8:2. In the prepared large-particle diameter and small-particle diameter active material, the entire composition was $Li(Ni_{0.88}Co_{0.09}Mn_{0.03})O_2$.

Using the prepared positive active material, a coin-type half cell was prepared in the same method as in Embodiment 1.

Comparative Example 2

Except that $ZrO_2$ (Aldrich, 4N) was only used and $Al_2O_3$ (Aldrich, 3N), $TiO_2$ (Aldrich, 3N), and $WO_3$ (Aldrich, 3N) were not used, the process was carried out in the same manner as in Embodiment 1 to prepare a large-particle diameter active material and a small-particle diameter active material and, and a positive active material was prepared by mixing them at 8:2. In the prepared large-particle diameter and small-particle diameter active material, the entire composition was $Li(Ni_{0.88}Co_{0.09}Mn_{0.03})_{0.997}Zr_{0.003}O_2$.

Using the prepared positive active material, a coin-type half cell was prepared in the same method as in Embodiment 1.

Comparative Example 3

Except that $ZrO_2$ (Aldrich, 4N) and $Al_2O_3$ (Aldrich, 3N) were only used and $TiO_2$ (Aldrich, 3N) and $WO_3$ (Aldrich, 3N) were not used, the process was carried out in the same manner as in Embodiment 1 to prepare a large-particle diameter active material and a small-particle diameter active material and, and a positive active material was prepared by mixing them at 8:2. In the prepared large-particle diameter and small-particle diameter active material, the entire composition was $Li(Ni_{0.88}Co_{0.09}Mn_{0.03})_{0.98}Zr_{0.003}Al_{0.017}O_2$.

Using the prepared positive active material, a coin-type half cell was prepared in the same method as in Embodiment 1.

X-Ray Diffraction Evaluation

A lattice constant of the positive active material of the active material prepared according to Embodiments 1 to 17 and Comparative Examples 1 to 3 was obtained by X-ray diffraction measurement using CuKα rays. The measured a-axis length and c-axis length are shown in Table 1 below. In addition, a distance ratio (a c/a axis ratio) between crystal axes is also shown in Table 1 below.

In addition, the grain size (a crystalline size) of the active material was measured and is shown in Table 1 below.

For the active material, a CuKα ray was used as a target ray, X'Pert powder (PANalytical) XRD equipment was used, a measurement condition was a condition of 2θ=10° to 80°, a scan speed (°/S)=0.328, a step size of 0.026°/step to perform an X-ray diffraction measurement test, and an intensity (a peak area) of a 003 plane and a 104 plane were determined.

From this result, I (003)/I (104) was obtained, and the result is shown in Table 1 below. For crystallographic consideration by doping, a Rietveld analysis was performed using high score plus Rietveld software, and the results are shown in Table 1 below as R-factor. An XRD measurement for the Rietveld analysis used CuKα rays as target rays, X'Pert powder (PANalytical company) XRD equipment was used, and a measurement condition was a condition of 2θ=10° to 130°, a scan speed (°/S))=0.328, and a step size of 0.026°/step, thereby the intensity of the 006 plane, the 102 plane, and the 101 plane were obtained, and from this result, the R-factor was calculated according to Equation 1 below, and the result is shown in Table 1 below. In this result, as a GOF (Goodness of Fit) value is calculated within 1.2, it may be said that the Rietveld structure analysis result is a reliable value.

R-factor={I 006+I 102}/I 101 [Equation 1]

From the results shown in Table 1, it may be confirmed that the factor values representing the crystal structure analyzed in the XRD change according to the doping element and the doping ratio. Particularly, it may be confirmed that the grain size greatly varies even in the same firing condition according to the doping element and doping content.

Particularly, as shown in the Table 1, it may be confirmed that the a-axis length and the c-axis length were not significantly changed according to the Zr doping, but the a-axis length and the c-axis length were slightly reduced according to the doping of Zr.

In addition, when doping Zr and Al together, it may be confirmed that the a-axis length further decreased while the c-axis length increased, and the positive ion mixing index of the I (003)/I (104) value rapidly decreased, and the R-factor also decreased.

In addition, it may be confirmed that the grain size of the ternary element or the quaternary element doped positive active material according to Embodiments 1 to 17 was obtained in 98.4 to 134.6 nm, because the grain size was reduced by 30 nm or more compared to the positive active material of Comparative Example 1 which is not doped.

EDS (Energy Dispersive X-Ray Spectroscopy) Analysis

TABLE 1

|  | a (Å) | c (Å) | c/a | grain size (nm) | I (003)/I (104) | R-factor | GOF |
|---|---|---|---|---|---|---|---|
| Comparative Example 1 | 2.8730 | 14.2063 | 4.9447 | 145.90 | 1.214 | 0.534 | 1.146 |
| Comparative Example 2 | 2.8664 | 14.1820 | 4.9476 | 146.70 | 1.212 | 0.532 | 1.146 |
| Comparative Example 3 | 2.8663 | 14.2352 | 4.9664 | 127.50 | 1.173 | 0.523 | 1.146 |
| Embodiment 1 | 2.8665 | 14.2378 | 4.9667 | 123.10 | 1.173 | 0.523 | 1.146 |
| Embodiment 2 | 2.8667 | 14.2388 | 4.9666 | 118.70 | 1.173 | 0.523 | 1.162 |
| Embodiment 3 | 2.8683 | 14.2218 | 4.9638 | 122.30 | 1.176 | 0.523 | 1.148 |
| Embodiment 4 | 2.8705 | 14.1821 | 4.9407 | 128.70 | 1.181 | 0.524 | 1.146 |
| Embodiment 5 | 2.8721 | 14.1821 | 4.9379 | 134.60 | 1.186 | 0.524 | 1.163 |
| Embodiment 6 | 2.8710 | 14.2828 | 4.9748 | 109.70 | 1.162 | 0.522 | 1.172 |
| Embodiment 7 | 2.8597 | 14.2864 | 4.9958 | 102.30 | 1.148 | 0.522 | 1.142 |
| Embodiment 8 | 2.8581 | 14.2864 | 4.9986 | 98.40 | 1.132 | 0.521 | 1.151 |
| Embodiment 9 | 2.8645 | 14.2308 | 4.9679 | 115.70 | 1.173 | 0.523 | 1.143 |
| Embodiment 10 | 2.8689 | 14.2469 | 4.9660 | 123.60 | 1.173 | 0.523 | 1.137 |
| Embodiment 11 | 2.8669 | 14.2397 | 4.9669 | 107.60 | 1.161 | 0.523 | 1.123 |
| Embodiment 12 | 2.8668 | 14.2394 | 4.9669 | 112.40 | 1.166 | 0.522 | 1.162 |
| Embodiment 13 | 2.8666 | 14.2384 | 4.9670 | 122.80 | 1.171 | 0.523 | 1.181 |
| Embodiment 14 | 2.8669 | 14.2414 | 4.9675 | 117.60 | 1.171 | 0.523 | 1.123 |
| Embodiment 15 | 2.8664 | 14.2350 | 4.9661 | 119.20 | 1.174 | 0.523 | 1.124 |
| Embodiment 16 | 2.8665 | 14.2356 | 4.9662 | 118.40 | 1.174 | 0.521 | 1.136 |
| Embodiment 17 | 2.8669 | 14.2315 | 4.9641 | 124.50 | 1.175 | 0.523 | 1.132 |

In Embodiment 2, a cross-section of the prepared positive active material is cut with an FIB (focused ion beam), and an element existing in the positive active material is mapped by an energy dispersive x-ray spectroscopy analysis to analyze a cross-sectional shape and a distribution of Ni, Mn, Co, W, O, Al, Zr, and Ti, and the results are respectively shown in FIG. 1.

As shown in FIG. 1, since the prepared positive active material according to Embodiment 2 is a high content Ni positive active material, Ni and O are very clearly displayed as images, and Mn and Co are also well seen. In addition, it may be confirmed that the Zr, Al, W, and Ti quaternary element elements used as doping elements exist, but that Al well appears due to a relatively large doping amount, whereas Zr, W, and Ti appear as dots due to relatively small doping amounts, but are uniformly present inside the positive active material.

SAED (Selected Area Diffraction) Photo

Figure 2A:
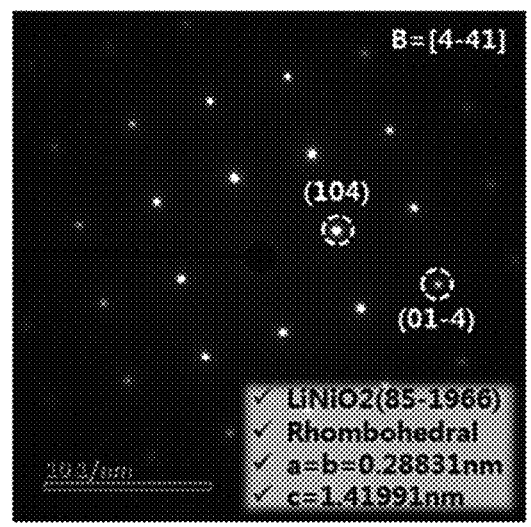
FIGS. 2A and 2B show diffraction (SAD) photograph on the surface and at the center, respectively, of a positive active material prepared according to a second embodiment.
Figure 2B:
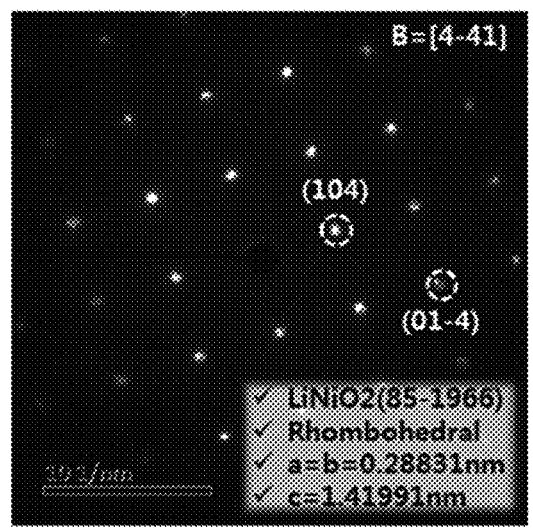

The SAD photograph obtained by measuring the diffraction pattern using TEM for the surface portion and the center portion of one primary particle of the large-particle diameter positive active material prepared according to Embodiment 2 is shown as (a) and (b) in FIG. 2, respectively. As shown in FIGS. 2(a) and (b), it may be confirmed that both the surface and the center portion have a rhombohedral layered structure of $LiNiO_2$.

Charge and Discharge Characteristic Evaluation

After aging the coin-type half cell prepared according to Embodiments 1 to 16 and Comparative Examples 1 to 3 at a room temperature of 25° C. for 10 hours, a charge and discharge test was performed.

A capacity evaluation was based on 205 mAh/g, and a charging and discharging condition was a constant current (CC)/constant voltage (CV) 2.5 V to 4.25 V, and ¹/₂₀ C cut-off condition.

After performing the charging and discharging of 0.1 C charge/0.1 C discharge once, the 0.2 C charge/0.2 C discharge was performed once, and the discharge capacity was measured, and the results are shown in Table 2 below as the discharge capacity. In addition, the 0.2 C discharge capacity ratio to the 0.2 C charge capacity was calculated, and the results are shown in Table 2 to Table 5 below as initial efficiency.

A room temperature cycle lifespan characteristic is at a room temperature of 25° C., a high temperature cycle lifespan characteristic is at a high temperature 45° C., and by performing the charge and discharge 30 times in the 0.3 C charging/0.3 C discharging condition, the discharge capacity ratio of 30 times to the one discharge capacity was calculated, and the results are shown in Table 2 to Table 5 below.

For high temperature initial resistance (DC internal resistance: DC-IR (direct current internal resistance)), with a constant current-constant voltage of 2.5 V to 4.25 V, and a ¹/₂₀ C cut-off condition at 45° C., the charge of 0.2 C and 0.2 discharge was carried out once to the battery, and the voltage value after 60 seconds after application of the discharge current at 4.25 V charging 100% was measured, calculated, and the results are shown in Table 2 to Table 5 below.

For a resistance increase rate, a resistance was measured in the same method as the initial resistance measurement method after 30 cycles of the cycle lifespan compared to a resistance (a high temperature initial resistance), initially measured at a high temperature 45° C. and an increasing rate thereof converted into percentage (%), the results are shown in Table 2 to Table 5 below.

For an average leakage current, current generation is measured over 120 hours when the half-cell is maintained at 4.7 V at a high temperature of 55° C., and an average value of the value is calculated and the result is shown in Table 2 to Table 5.

For a differential scanning calorimetry (DSC) analysis, the half-cell is charged to 4.25 V at the initial 0.1 C charge condition and disassembled to obtain only the positive electrode separately, and the positive electrode is prepared by being washed five times with dimethyl carbonate. After impregnating the washed positive electrode in a DSC crucible with an electrolyte solution, the temperature was increased to 265° C., and a calorie change was measured using a DSC1 star system of Mettler Toledo with a DSC instrument, an obtained DSC peak temperature and a calorific value results are shown in Table 2 to Table 5 below. The DSC peak temperature represents a temperature at which a thermal peak appeared.

TABLE 2

|  | Discharge capacity (mAh/g) | initial efficiency (%) | Room temperature lifespan (%) | High temperature lifespan (%) | High temperature Initial resistance (Ω) | Resistance increase rate (%) | Average leakage current (mA) | DSC peak temperature (° C.) | Calorific value (J/g) |
| --- | --- | --- | --- | --- | --- | --- | --- | --- | --- |
| Comparative Example 1 | 213.1 | 88.2 | 90.1 | 85.5 | 29.5 | 180 | 0.56 | 218.3 | 1720 |
| Comparative Example 2 | 210.3 | 89.5 | 94.5 | 92.5 | 28.5 | 160 | 0.48 | 219.5 | 1650 |
| Comparative Example 3 | 206 | 89.3 | 94.3 | 92.3 | 27.1 | 113 | 0.45 | 234.5 | 1214 |
| Embodiment 1 | 206.3 | 89.4 | 94.6 | 93.1 | 25.1 | 102 | 0.37 | 234 | 1310 |
| Embodiment 2 | 207 | 90.1 | 98 | 95.1 | 15.2 | 50 | 0.12 | 241.1 | 1021 |
| Embodiment 3 | 207 | 90 | 97.9 | 95 | 15.5 | 53 | 0.13 | 239.0 | 1025 |
| Embodiment 4 | 207.1 | 90.3 | 97.6 | 94.9 | 15.5 | 55 | 0.14 | 239.5 | 1020 |
| Embodiment 5 | 207 | 90 | 97.5 | 95 | 16.8 | 75 | 0.21 | 232.5 | 1320 |

TABLE 2-continued

|  | Discharge capacity (mAh/g) | initial efficiency (%) | Room temperature lifespan (%) | High temperature lifespan (%) | High temperature Initial resistance (Ω) | Resistance increase rate (%) | Average leakage current (mA) | DSC peak temperature (° C.) | Calorific value (J/g) |
|---|---|---|---|---|---|---|---|---|---|
| Embodiment 6 | 206.6 | 89.7 | 97.8 | 94.7 | 15.8 | 60 | 0.16 | 240.5 | 1125 |
| Embodiment 7 | 206 | 89.8 | 97.5 | 94.8 | 16.6 | 69 | 0.19 | 238.3 | 1088 |
| Embodiment 8 | 198.5 | 89.1 | 96.4 | 92.5 | 17.5 | 88 | 0.21 | 238.5 | 1100 |

As shown in Table 2, in the case of the battery of Comparative Example 1 using the positive active material that does not include the doping element, it may be confirmed that the discharge capacity is the highest at 213.1 mAh/g, but the room temperature and high temperature cycle lifespan characteristics are very low, the resistance increase rate is 180%, and the average leakage current is also very high at 0.56 mA. Particularly, the DSC peak temperature, which represents a thermal safety index, is 218.3° C., indicating that the thermal safety is very low.

The cell of Comparative Example 2, using the positive active material doped with Zr alone has somehow stabilized the structure, and the room temperature and high temperature cycle lifespan characteristics are slightly improved compared to Comparative Example 1, but the average leakage current is still high, and also the DSC peak temperature had little improvement. When describing the cell of Comparative Example 3 using the positive active material doped with Zr and Al at the same time, when Al is doped at 1.7 mol %, the capacity slightly decreases, and the cycle lifespan characteristic and resistance increase rate were improved, particularly the DSC peak temperature was a large increase in 234.5° C., but the leakage current and initial resistance were still high.

On the other hand, in the case of the cell of Embodiment 1 using a positive active material doped with three elements of Zr, Al, and Ti at the same time, it may be confirmed that the high temperature cycle lifespan characteristic and resistance increase rate are significantly improved compared to the comparative examples.

In addition, in the cell results of Embodiments 3, 4, 6, and 7 including a positive active material in which the amounts of Zr, Ti, and W are fixed constant and only the Al content is changed, the discharge capacity is excellent, as well as the initial efficiency, room temperature cycle lifespan, and high temperature, it can be seen that cycle lifespan characteristic, high temperature initial resistance, resistance increase rate, and average leakage current are improved, and the DSC peak temperature and calorific value characteristic are also improved.

In the case of Embodiment 5 using a positive active material with an Al content of 0.007 mol, it may be confirmed that the excellent discharge capacity, initial efficiency, room temperature cycle lifespan characteristic, and high temperature cycle lifespan characteristic are exhibited, and low high temperature initial resistance, resistance increase rate, and average leakage current are exhibited, and in the case of Embodiment 8 using a positive active material having an Al content of 0.033 mol, it may be confirmed that excellent initial efficiency, low high temperature initial resistance, and average leakage current are exhibited, and improved DSC peak temperature and calorific value characteristics are exhibited.

From the results shown in Table 2, it may be confirmed that when the quaternary elements of Zr, Al, Ti, and W are doped into a positive active material including a high content of Ni, cell chemistry characteristics may be greatly improved.

TABLE 3

|  | Discharge capacity (mAh/g) | initial efficiency (%) | Room temperature lifespan (%) | High temperature lifespan (%) | High temperature initial resistance (Ω) | Resistance increase rate (%) | Average leakage current (mA) | DSC peak temperature (° C.) | Calorific value (J/g) |
|---|---|---|---|---|---|---|---|---|---|
| Embodiment 9 | 201.2 | 90 | 98.2 | 94.8 | 16.8 | 62 | 0.19 | 240.2 | 986 |
| Embodiment 10 | 208.7 | 89.8 | 97 | 94 | 20 | 74 | 0.24 | 239.2 | 1,032 |

In addition, in the case of Embodiment 2 using a positive active material doped with the quaternary elements of Zr, Al, Ti, and W at the same time, It may be confirmed that the discharge capacity was 207 mAh/g, the initial efficiency was 90.1%, which was similar to the design value, particularly the temperature cycle lifespan and high temperature cycle lifespan characteristics, high temperature initial resistance, resistance increase rate, and average leakage current are significantly improved. Particularly, the DSC peak temperature is 241.1° C., indicating a very high value even though the Ni content is 85 mol % or more.

As shown in Table 3, in the case of Embodiment 10 using a positive active material in which the amounts of Al, W, and Ti are kept constant and the amount of Zr doping is changed, it may be confirmed that the excellent discharge capacity, initial efficiency, room temperature cycle lifespan, and high temperature cycle lifespan characteristics are exhibited, and low high temperature initial resistance, resistance increase rate, average leakage current are exhibited, and the improved DSC peak temperature and calorific value are exhibited.

In the case of Embodiment 9 using a positive active material with a Zr doping ratio of 0.002 mol, it may be confirmed that excellent initial efficiency, room temperature cycle lifespan, and high temperature cycle lifespan characteristics are exhibited, and the low high temperature initial resistance, resistance increase rate, and average leakage current are exhibited, while the improved DSC peak temperature and calorific value are exhibited.

initial efficiency, room temperature cycle lifespan, and high temperature cycle lifespan characteristics are exhibited, and the improved DSC peak temperature and calorific value are exhibited.

In the case of Embodiment 16 where the Ti doping ratio is 0.0005 mol, it may be confirmed that the excellent discharge capacity, initial efficiency, room temperature cycle lifespan, and high temperature cycle lifespan characteristic

TABLE 4

| | Discharge capacity (mAh/g) | initial efficiency (%) | Room temperature lifespan (%) | High temperature lifespan (%) | High temperature initial resistance ($\Omega$) | Resistance increase rate (%) | Average leakag current (mA) | DSC peak temperature (° C.) | Calorific value (J/g) |
|---|---|---|---|---|---|---|---|---|---|
| Embodiment 11 | 198 | 89.6 | 98.7 | 96.1 | 15.0 | 56 | 0.15 | 238.7 | 980 |
| Embodiment 12 | 205 | 89.5 | 98.1 | 95.8 | 18.2 | 65 | 0.21 | 238.8 | 1,120 |
| Embodiment 13 | 207 | 90.1 | 96.8 | 94.2 | 15.9 | 60 | 0.23 | 236 | 1,330 |

As shown in Table 4, in the case of Embodiments 12 and 13 using positive active materials in which the amounts of Zr, Al, and Ti are kept constant and the amount of W doping is changed, it may be confirmed that the excellent discharge capacity, initial efficiency, room temperature cycle lifespan, and high temperature cycle lifespan characteristics are exhibited, the low high temperature initial resistance, resistance increase rate, and average leakage current are exhibited, and improved DSC peak temperature and calorific value are exhibited.

In addition, in the case of Embodiment 10, where the W doping amount is 0.001 mol, the initial efficiency, room temperature cycle lifespan, and high temperature cycle lifespan characteristics are exhibited, the low high temperature initial resistance, resistance increase rate, and average leakage current are exhibited, and the improved DSC peak temperature and calorific value are exhibited.

are exhibited, the low high temperature initial resistance is exhibited, and the improved DSC peak temperature and calorific value are exhibited.

In addition, even in the case of Embodiment 17 in which the ternary doping element is used and a positive active material having no core-shell concentration gradient is applied at the same time, it may be confirmed that the excellent initial efficiency, room temperature cycle lifespan, and high temperature cycle lifespan characteristics are exhibited, and the improved DSC peak temperature and calorific value are exhibited.

The present invention may be embodied in many different forms, and should not be construed as being limited to the disclosed embodiments. In addition, it will be understood by those skilled in the art that various changes in form and

TABLE 5

| | Discharge capacity (mAh/g) | Initial efficiency (%) | Room temperature lifespan (%) | High temperature lifespan (%) | High temperature initial resistance ($\Omega$) | Resistance increase rate (%) | Average leakage current (mA) | DSC peak temperature (° C.) | Calorific value (J/g) |
|---|---|---|---|---|---|---|---|---|---|
| Embodiment 14 | 192 | 92.1 | 96.5 | 93.3 | 24.2 | 88 | 0.31 | 239.3 | 1,221 |
| Embodiment 15 | 207.3 | 89.8 | 98.2 | 95.4 | 16.7 | 56 | 0.17 | 240.6 | 1,110 |
| Embodiment 16 | 208 | 90.2 | 98.1 | 95.6 | 20 | 84 | 0.24 | 240.2 | 1,002 |
| Embodiment 17 | 207.3 | 90.4 | 98.2 | 95.4 | 15.1 | 48 | 0.11 | 240 | 1,003 |

As shown in Table 5, in the case of Embodiment 15 using a positive active material in which the amounts of Zr, Al, and W are kept constant and the amount of Ti doping is changed, it may be confirmed that the excellent discharge capacity, initial efficiency, room temperature cycle lifespan, and high temperature cycle lifespan characteristics are exhibited, the low high temperature initial resistance, resistance increase rate, and average leakage current are exhibited, and the improved DSC peak temperature and calorific value are exhibited.

In the case of Embodiment 14, in which the Ti doping ratio is 0.004 mol, it may be confirmed that the excellent details may be made thereto without departing from the technical spirit and essential features of the present invention. Therefore, it is to be understood that the above-described exemplary embodiments are for illustrative purposes only and the scope of the present invention is not limited thereto.

The invention claimed is:

1. A positive active material for a lithium secondary battery comprises lithium, nickel, cobalt, manganese, and a doping element, wherein the doping element includes Zr, Al, and Ti,
wherein the positive active material for the lithium secondary battery is represented by Chemical Formula 1 below:

$$Li_{a1}[Ni_{x1}Co_{y1}Mn_{z1}]_{t1}(Zr_{h1}Al_{g1}Ti_{u1})O_{2-p}X1_p \quad \text{[Chemical Formula 1]}$$

in Chemical Formula 1,
X1 is at least one element selected from a group including F, N, and P,
a1 is $0.8 \leq a1 \leq 1.3$,
t1 is $0.9580 < t1 < 0.9915$, and
$0.6 \leq x1 \leq 0.95$, $0 < y1 \leq 0.2$, $0 < z1 \leq 0.2$, $0.0010 \leq h1 \leq 0.005$, $0.007 \leq g1 \leq 0.033$, $0.0005 \leq u1 \leq 0.004$, and $0 \leq p \leq 0.02$.

2. The positive active material for the lithium secondary battery of claim 1, wherein
the doping element further includes W.

3. The positive active material for the lithium secondary battery of claim 2, wherein
the doping ratio of W is 0.03 mol % to 0.1 mol % with respect to 100 mol % of nickel, cobalt, manganese, and the doping element.

4. The positive active material for the lithium secondary battery of claim 2, wherein
the positive active material for the lithium secondary battery is represented by Chemical Formula 2 below:

$$Li_{a2}[Ni_{x2}Co_{y2}Mn_{z2}]_{t2}(Zr_{h2}Al_{g2}W_jTi_{u2})O_{2-p}X2_p \quad \text{[Chemical Formula 2]}$$

in Chemical Formula 2,
X2 is at least one element selected from a group including F, N, and P,
a2 is $0.8 \leq a2 \leq 1.3$,
t2 is $0.9570 \leq t2 \leq 0.9912$, and
$0.6 \leq x2 \leq 0.95$, $0 < y2 \leq 0.2$, $0 < z2 \leq 0.2$, $0.001 \leq h2 \leq 0.005$, $0.007 \leq g2 \leq 0.033$, $0.0003 \leq j \leq 0.001$, $0.0005 \leq u2 \leq 0.004$, and $0 \leq p \leq 0.02$.

5. The positive active material for the lithium secondary battery of claim 1, wherein
the positive active material for the lithium secondary battery has a ratio I (003)/I (104) of a peak intensity on a 003 plane to a peak intensity on a 104 plane of 1.1 to 1.2 when measuring an X-ray diffraction pattern.

6. The positive active material for the lithium secondary battery of claim 1, wherein
for the positive active material for the lithium secondary battery, when measuring an X-ray diffraction pattern, an a-axis length (La) is 2.8500 Å to 2.8800 Å, a c-axis length (Lc) is 14.1800 Å to 14.2900 Å, and a distance ratio (c/a) between a crystal axis of the c-axis length to the a-axis length is 4.93 to 5.0.

7. The positive active material for the lithium secondary battery of claim 1, wherein
for the positive active material for the lithium secondary battery when measuring an X-ray diffraction pattern,
an average grain size (a crystalline size, Lc) is 80 nm to 140 nm,
and an R-factor value represented by Equation 1 is 0.52 to 0.55, $$R\text{-factor} = \{I\,006 + I\,102\}/I\,101 \quad \text{[Equation 1]}.$$

8. A lithium secondary battery comprising:
a positive electrode including a positive active material of claim 1;
a negative electrode; and
a non-aqueous electrolyte.

* * * * *